Figure 1:
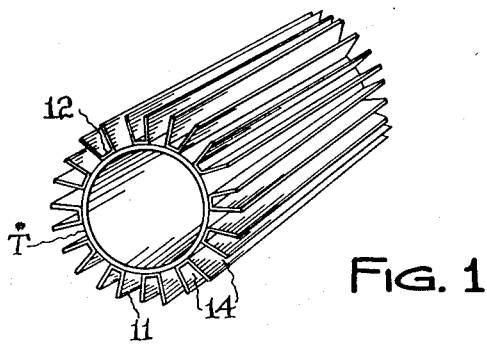

Oct. 23, 1951     J. W. BROWN, JR     2,572,593
APPARATUS FOR BRAZING FINS TO TUBES

Filed Feb. 10, 1947     4 Sheets-Sheet 1

INVENTOR.
JOHN W. BROWN JR
BY
*Bosworth & Sessions*
ATTORNEYS

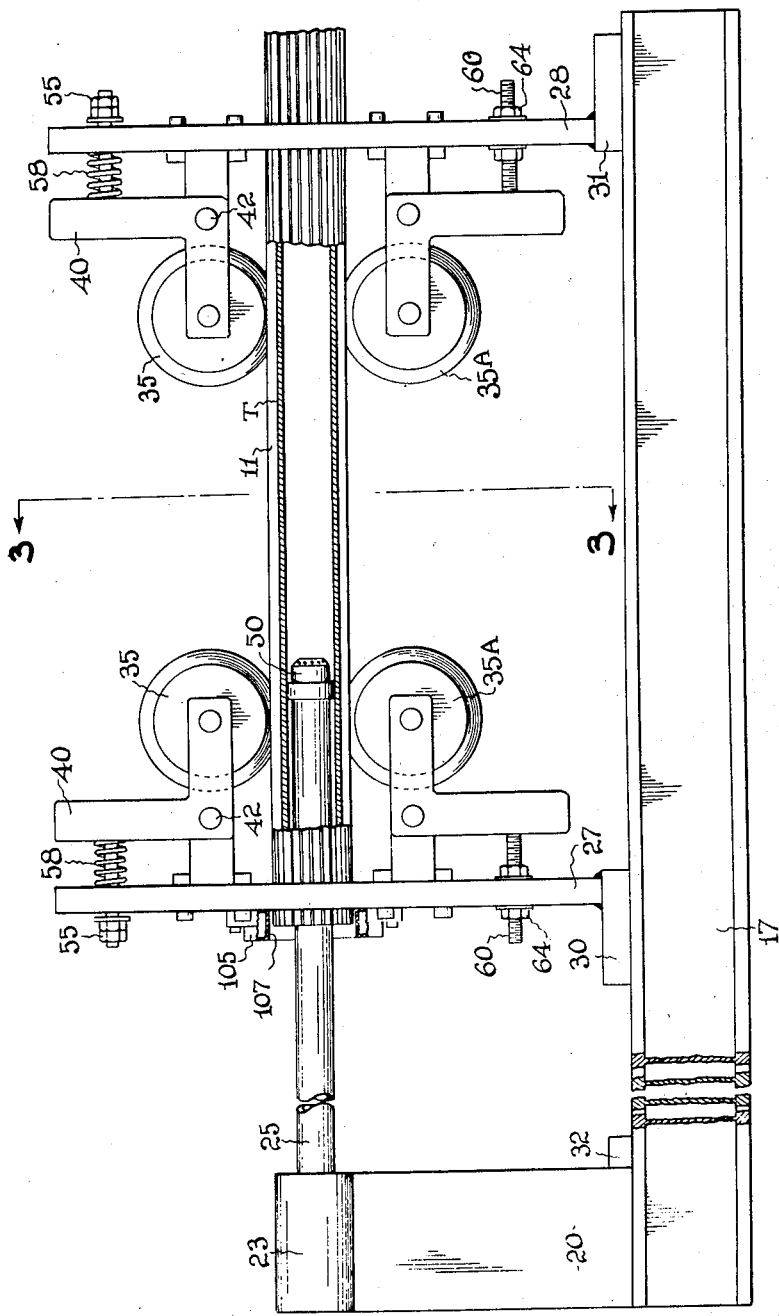

Oct. 23, 1951 J. W. BROWN, JR 2,572,593
APPARATUS FOR BRAZING FINS TO TUBES
Filed Feb. 10, 1947 4 Sheets-Sheet 3

INVENTOR.
JOHN W. BROWN JR.
BY
Bosworth & Sessions
ATTORNEYS.

Patented Oct. 23, 1951

2,572,593

UNITED STATES PATENT OFFICE 2,572,593

APPARATUS FOR BRAZING FINS TO TUBES

John W. Brown, Jr., Lakewood, Ohio, assignor to Brown Fintube Company, Elyria, Ohio, a corporation of Ohio Application February 10, 1947, Serial No. 727,598

8 Claims. (Cl. 113—59)

1

This invention relates to a method and an apparatus for attaching fin members to tubes to produce finned tubes adapted for various uses, principally for use as heat exchanger conduits. More particularly the invention is adapted for fusing metallic fins to the exterior of a metallic tube by the application of heat.

In the manufacture of heat exchangers it is desirable to augment the area of the fluid conducting tubes or conduits employed by securing heat transfer fins of various types to the tubes. Fins extending longitudinally of the tubes are particularly desirable in some types of installations because of the more desirable flow characteristics which can be obtained in the fluid surrounding the tube. Apparatus for making finned tubes by electric conduction welding to secure a plurality of fins to the exterior of a tube is illustrated and claimed in my Patent No. 2,298,249, issued October 6, 1942, to my present assignee. In that patent there is illustrated a group of welding electrodes that ride over the base portion of a heat conducting fin and by the use of a welding current securely bond these base portions to the exterior of the tube.

In the present invention a similar form of finned tube is produced by a brazing operation due to heat applied to the parts as contrasted with one in which welding current is passed through the region at which the bond is formed to heat by electrical resistance to its travel. This is accomplished in the present invention by raising the temperature of the tube and fins and solder or other bonding material to either a soldering or brazing temperature to form a bond between the parts which are thereafter cooled to harden the solder and complete the operation. The operation is a progressive one in which successive increments of the tube and fins are first raised to fusing temperature and thereafter cooled to provide a continuous bond securing a long longitudinal fin to a tube.

It is a general object of the present invention to provide an improved method and apparatus for bonding fins to a tube by the application of heat to the parts in progressive increments. Another object of the invention is to provide a method and apparatus for progressively bonding elongate axially extending fin members to the exterior of a tube by first heating successive increments of the tube in the region of the bond to fusing temperature and thereafter cooling them. Another object of the invention is to bond a plurality of elongate fins to a tube by moving the tube and an internal heating and cooling mandrel relative to each other first to heat and thereafter to cool successive annular increments along the tube to which the fins are to be bonded. Still a further object is to accomplish a progressive bonding operation by moving a mandrel head and the tube relative to each other first to direct a fluid stream at an elevated temperature from a flame heating means against an annular increment of the inside of the tube and thereafter to direct fluid coolant against that increment of surface that previously has been heated.

Other objects of the invention will become apparent from the drawings and from the following description. The novel features of the invention are set forth in the claims.

Figure 3:
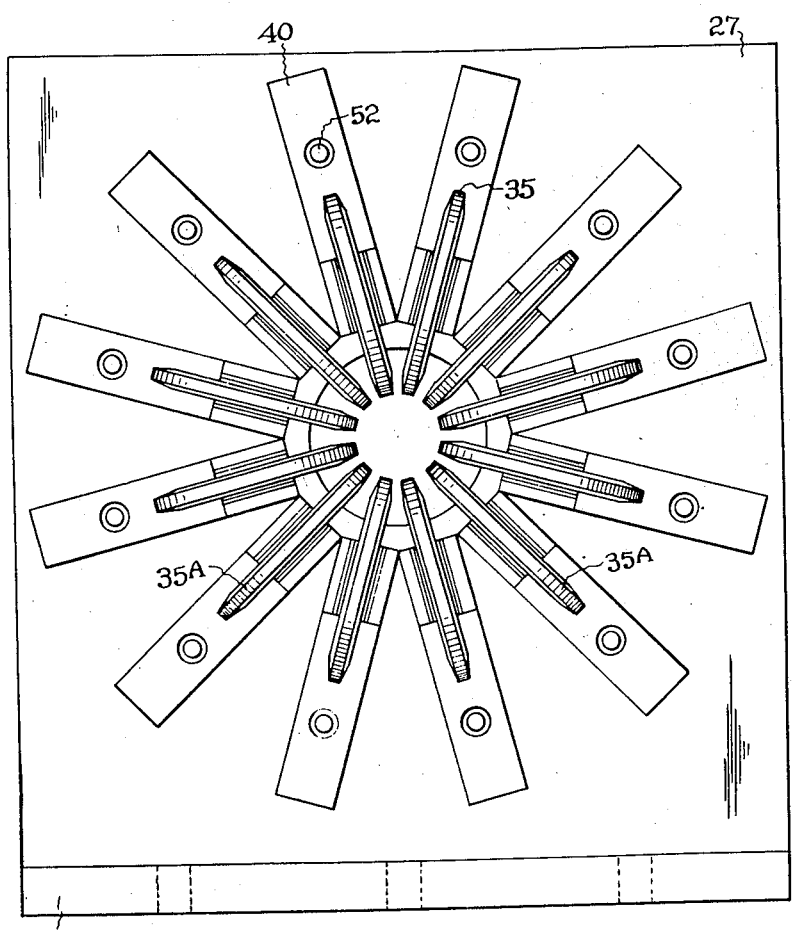
Figure 4:
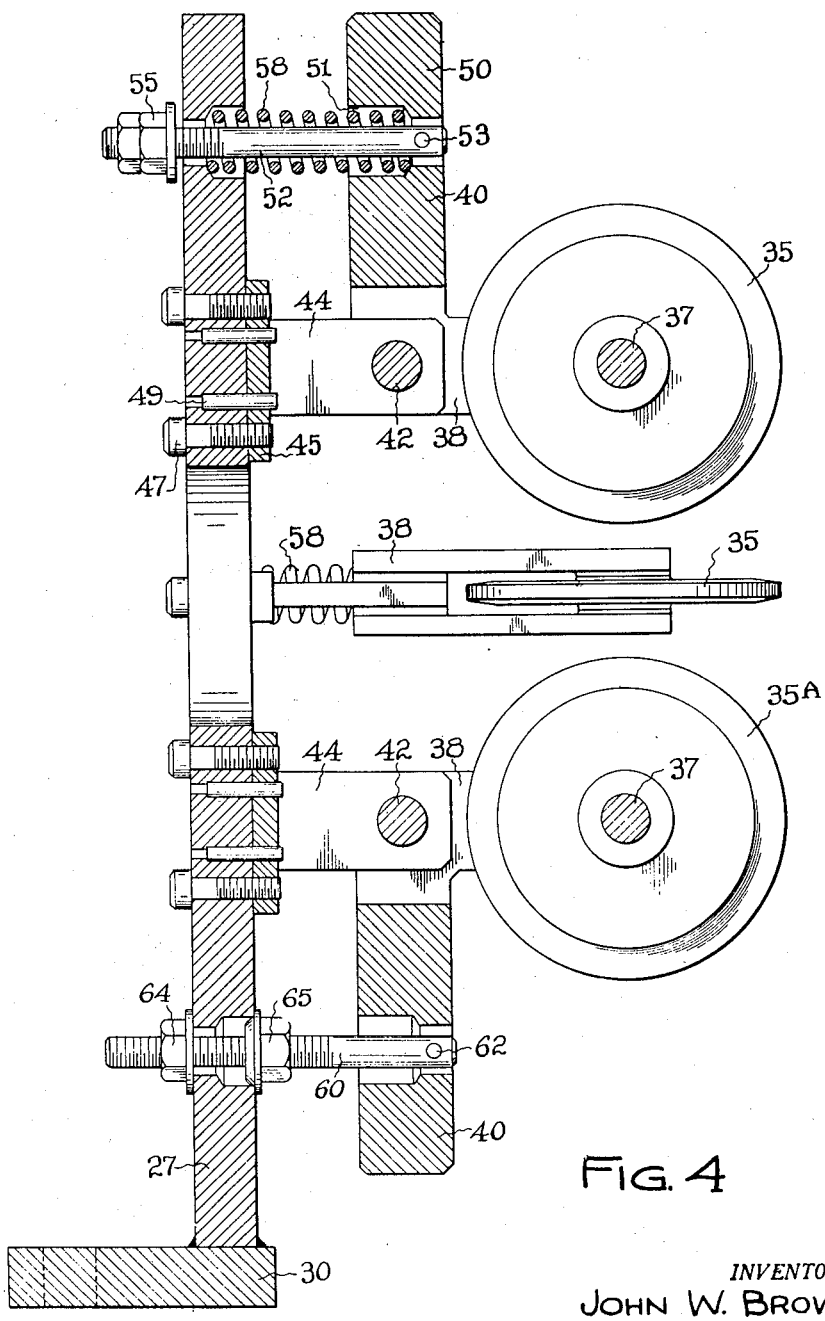
Figure 7:
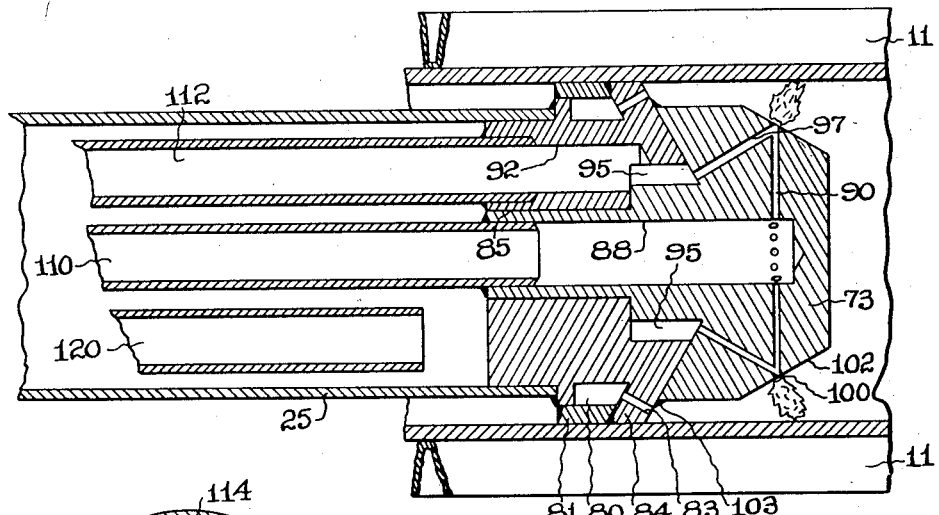
Figure 6:
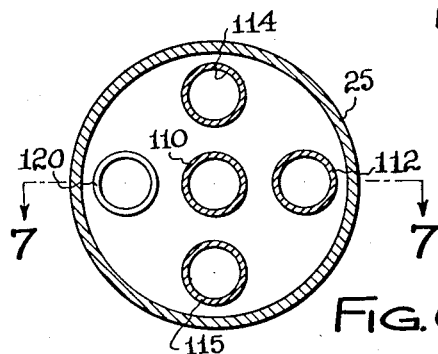
Figure 5:
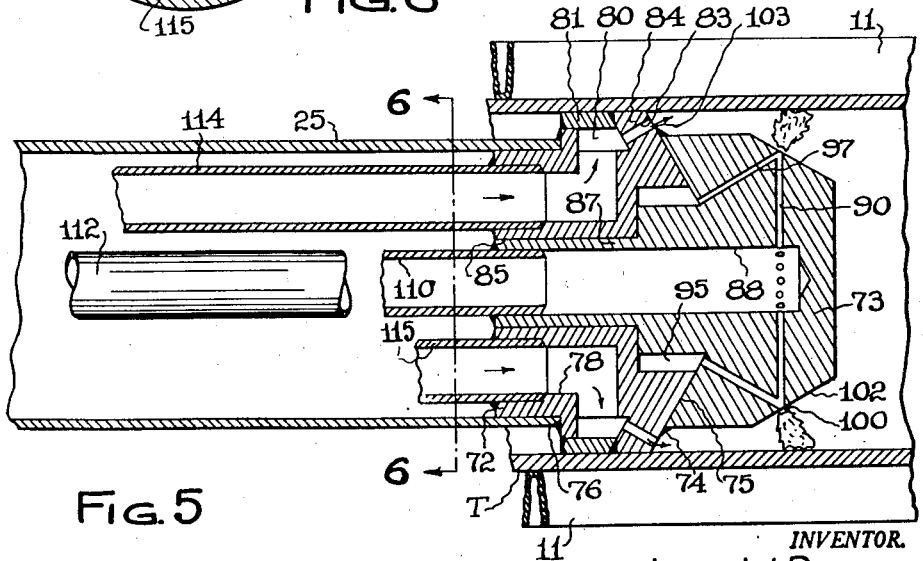

In the drawings: Figure 1 is a perspective view illustrating a section of finned tube made according to my invention; Figure 2 is an axial section through one form of apparatus used with the present invention; Figure 3 is a section through Figure 2 as indicated by the lines 3—3 thereon; Figure 4 is a section in the plane of Figure 2 showing on an enlarged scale a portion of the tube and fin clamping mechanism; Figure 5 is an enlarged axial section through one form of mandrel head; Figure 6 is a section through Figure 5 as indicated by the lines 6—6 thereon; and Figure 7 is a section through the mandrel head as indicated by the lines 7—7 on Figure 6.

As shown in Figure 1 of the drawings a finned tube made in the manner embodying my invention may comprise a tubular conduit member T to which a number of finned members 11 are secured. Each fin member is preferably of channel cross section and comprises a base portion 12 and two fins 14. An alternative form of fin that is not illustrated herein but that may be embodied in conduits made with the apparatus and method of the present invention is of L-shaped cross section with the base of the L secured to the tubular conduits T and the arm of the L acting as a heat exchanger fin. It will be evident to those skilled in the art that the transfer of heat between the tube T and the fins 14 must take place through the base portion 12 and to this end I secure the channel members to the tube by a fusing or bonding operation performed as hereafter described.

In this operation the tube and an internal mandrel are moved relative to each other, preferably by holding the mandrel stationary and sliding the tube over a mandrel head at the unsupported end of the mandrel. The mandrel head is so constructed that an annular ring of hot burning gas is directed against an annular increment or segment on the inside of the tube adjacent to it. Provision is also made for projecting coolant, preferably in the form of cool air, from openings in the mandrel head against an adjacent annular portion on the inside of the tube. As the tube and the mandrel head are moved relative to each other successive annular increments of the tube will first be heated and then cooled as they pass over the head of the mandrel. It is important that the mandrel head and tube be moved relative to each other in such a way that the hot gas is never directed against an increment of tube that already has been cooled to complete the affixing of the fin to the tube in that particular increment or the bond already made would be undone. A series of elongate fin members extending substantially parallel to the axis of the tube are held in place against it and fixed with respect to it during the above described heating and cooling operation. Solder or other bonding material placed at the region to be bonded is melted and flows to form the bond after which it is cooled and hardened. As stated it is preferable to move the tube with respect to a fixed mandrel and for this purpose a plurality of rollers are provided that ride in the channels of the respective fins and are urged by springs toward the tube axis firmly to hold the fins and tube during their movement in the bonding process.

Referring now to Figure 2 it will be seen that the rollers are mounted on a frame that also supports one end of the mandrel. This frame comprises a pair of parallel I-beams 17 that are mounted on a suitable bed, not shown. At one end the I-beams support a post 20 to which is secured a fixture 23 adapted to receive and clamp the fixed end of a hollow mandrel 25. Near the end of the frame opposite the mandrel supporting post 20 are two sets of clamping and guiding rollers supported on plates 27 and 28 that are welded to and supported by cross plates 30 and 31. These plates together with an additional cross plate 32 are secured to the beams 17 to provide cross braces for the frame by which the other parts of the apparatus are supported.

The sets of guiding and clamping rollers carried by each of the plates 27 and 28 are identical except that, as shown in Figure 2, one set is reversed in position to face the other. Because of their similarity in construction only one set of rollers will be described, i. e., those attached to the plate 27 and shown at the left of Figure 2.

Twelve channel shaped fins may be simultaneously secured to the exterior of a tube T by twelve rollers (Figure 3) in the embodiment of the invention illustrated herein. The provision of twelve channel members results in a total of twenty-four fins because there are two fins on each of the channels. Two of the twelve rollers are carried on axes that are fixedly mounted with respect to the plate 27 to provide means for accurately locating a tube with respect to the axis of the mandrel. The other ten rollers are resiliently urged toward the axis, and in two instances also toward the opposite fixed rollers, to cooperate in clamping the twelve channel members against the tube T. It will be apparent that a different number of rollers may be used depending upon the number of fins it is desired to bond to the tube.

One of the spring urged rollers together with its support is best shown at the top of Figure 4 and is indicated at 35. Each of these rollers is mounted for rotation about a pin 37 that is supported between the sides of a bifurcated arm 38 of a bell crank lever 40. The lever 40 is pivotally mounted on a pin 42 carried in a support 44 that is provided with a base portion 45 secured against the plate 27 by bolts 47 and locating pins 49.

The other arm 50 of the bell crank 40 is bored as at 51 to receive a threaded pin 52 that is pivotally fastened to it by a pin 53. Suitable nuts 55 carried by the pin 52 bear against the plate 27 and limit the inward or clockwise movement of the roller 35 (Figure 4). The roller normally is urged inwardly as far as the nuts permit by a coil spring 58 bearing at one end against the plate 27 and at the other end against the adjacent arm 50 of the lever 40. The clamping force exerted by the roller 35 is dependent upon the spring 58 and the inward limit of roller travel may be adjusted by shifting the nuts 55.

The external periphery of each of the rollers 35 is shaped as best shown in Figure 3 to correspond to the internal form of those fins in which the rollers ride during the bonding operation. Thus the outer edge is flat and about as wide as the fin base against which it bears while the outer side edges are slightly tapered to correspond to the angle at which the fins stand to the base.

All of the rollers shown in Figure 3 are mounted on arms 45 in this manner except the two rollers spaced 90° apart and indicated at 35A. These two rollers lie on the under side of a tube received in the central aperture defined by the inner edges of the rollers and support the tube against dropping down out of alignment with other parts of the apparatus. At the same time the rollers 35A afford a positive limit against which the tube is held and prevent the tube from floating away from the mandrel axis by displacement as a group of all of the rollers that bear against it.

The rollers 35A each are supported on a pin 37 between bifurcations 38 of an arm of a bell crank 40 as shown at the bottom of Figure 4. The bell crank 40 is pinned at 42 to a support 44 that in turn is secured to the plate 27 in the same manner as are the arms carrying the rollers 35 as shown at the top of Figure 4.

To provide a fixed support for the tube the rollers 35A beneath them are locked against bodily displacement. To thus lock a roller 35A pins 60 are pivotally secured at 62 to arms of the supporting bell crank 40 and at the other end are fixed in position with respect to the plate 27 by nuts 64 and 65 on opposite sides thereof.

The two sets of rollers carried by the plates 27 and 28 cooperate to clamp together a tube and a plurality of fins to be fed as a unit relative to a mandrel during the bonding or fusing operation. In the present embodiment of the invention the mandrel and the rollers 35 and 35A remain fixed with respect to each other and the frame while the tube and fins are moved relative to the bed and fed over a mandrel head on the mandrel 25. The tube is fed onto the mandrel during the heating and cooling operation with the result that it is fully seated on the mandrel after the fins have been bonded in place. It will be evident that various arrangements may be provided to produce relative movement between the tube and its fins on the one hand and the heating and cooling unit on the other hand and that such modifications may be made without departing from the scope of the present invention.

The mandrel used with the present invention has previously been designated 25 and stated to be mounted on a post 20 shown at the left-hand side of Figure 2. It is hollow to carry a series of conduits for bringing fuel and coolant to a mandrel head 50 at the unsupported end as best shown in Figures 5, 6 and 7. The mandrel head comprises a body 72 and a nose 73 fitting into and secured to the body by an annular weld 74. Complementary sharply tapered surfaces of the body and nose abut along a line 75 to position the two parts with respect to each other. The body in turn fits within and is secured to the hollow mandrel 25 and is provided with a radial shoulder 76 against which the mandrel end abuts.

The body portion is formed to provide two spaced intake passages 78 (Figure 5) each leading into an annular passage 80 that is capped by an outer ring 81 brazed to the body. The passage 80 communicates with a plurality of discharge orifices 83, in the present case twelve, by which coolant in the form of compressed air is directed against an adjacent annular increment of a tube T that is positioned on the mandrel. The tube in turn is centered on the mandrel by the ring 81 and the corresponding radial extension 84 of the body whose external diameters fit closely within the internal bore of the tube and yet readily permit relative sliding motion between them.

The body 72 is centrally bored at 85 to receive a central sleeve 87 of the nose 73. The sleeve 87 in turn is centrally bored as at 88 and terminates in a series, in the present case twelve, of radially drilled oxygen discharge passages 90. Oxygen fed to the bore 88 and through these passages mixes at the outer surface of the nose with fuel supplied as a gas.

To supply gas for combustion the body 72 is provided with an eccentric bore 92 (Figure 7) that communicates with an annular passage 95 formed in the body-nose construction making up the complete mandrel head. Gas from the passage 95 is conducted through twelve orifices 97 to mix with oxygen from respective passages 90 at points 100 on a sharply tapered outer surface 102 of the nose 73. The sharp taper on the nose is to facilitate entry of the mandrel head into a tube at the beginning of the bonding operation. In like manner a similar tapered surface 103 is provided to guide the end of the tube from a cylindrical portion of the nose 73 onto the guiding portion 81 that is of the greatest diameter.

It will be seen by reference to Figures 5 and 7 that the discharge orifices 83 for cooling air and orifices 90 and 97 for oxygen and gas all discharge outwardly against the interior of a tube that is being guided over the surfaces 81 and 84. The flame formed by combustion of the gas and oxygen takes a shape something like that shown in Figure 5 to impinge directly on the tube surface. This results in heating an annular increment of the tube as the tube and mandrel head are moved with respect to each other. At the same time the flame and its products of combustion travel along the tube and exhaust at the end remote from the mandrel; in doing so the tube wall beyond the increment subject to direct impingement of the flame is preheated as it approaches the flame. The rate at which they are moved is dependent upon the amount of heat required at any one increment to perform the bonding operation. When sufficient heat is present in the tube and in the fins held against it by the rollers 35 and 35A the brazing or soldering material will flow to form the bond. As the tube with its fins, and the mandrel head continue to move with respect to each other the portion of the former that has been so heated will pass out of the ring of heating flame and into a position where coolant from the orifices 83 will impinge upon the heated increment to cool the region of the bond. During the time this cooling action is taking place on one increment of the tube the next and adjacent increment will be heated by the burning gas at 100.

In some instances it is desirable to cool the tube-fin combination further and to this end a cooling ring 105 is secured to the plate 27 to discharge through orifices 107 on the fins and exterior of the tube passing through it as shown in Figure 2. The coolant used in the ring 105 and the coolant discharged through the orifices 83 is preferably compressed air at ordinary temperatures although it will be apparent that other coolants in either liquid or gaseous form may be used.

Various fluids supplied to the mandrel head are brought to it through conduits on the inside of the hollow mandrel 25. Thus a central conduit 110 (Figure 6) is secured in the sleeve 87 to supply oxygen to the passage 88. Fuel gas is supplied through a conduit 112 that is secured in the body 72 (Figure 7) to communicate with the passage 92. Compressed air for cooling purposes is supplied from two conduits 114 and 115 secured in the body 72 (Figure 5) to communicate with the passage 80. All of these supply conduits 110, 112, 114 and 115 are supplied from suitable sources entering into the conduit at its fixed end adjacent the post 20.

Under continued operation the mandrel head and its associated parts becomes so hot as to require cooling. This is accomplished by means of a conduit 120 (Figure 5) that brings cooling water into the hollow mandrel and discharges it as shown closely adjacent the mandrel head. After the water leaves the conduit 120 it circulates through the hollow mandrel and returns to the fixed end where it is removed, thus affording continuous circulation of cooling water.

In practicing the invention embodied herein the required number of fins and the tube to which they are to be bonded are fed into the central aperture defined by the rollers positioned as shown in Figure 3. The respective rollers are adjusted so that each rides in a fin channel and thus the action of the springs 58 forces the rollers toward each other to clamp the fins and tube together. The rolling friction of the rollers is negligible and hence the fin-tube unit may be fed through the apparatus from right to left as shown in Figure 2 passing over the mandrel head and inside of the cooling ring 105. The mandrel is long enough to accommodate the desired lengths of tube and fins and permit the fin bases to be bonded to the tube over their entire length. After the bonding operation has been completed the assembled tube and fins are removed as a unit from the mandrel after which the operation may be repeated with a new assembly of tube and fins.

I claim:

1. In apparatus for simultaneously bonding a plurality of elongate members to the exterior of a tube by heating to fusing temperatures and thereafter cooling a bonding metal disposed between adjacent surfaces of the tube and members, a frame, a mandrel fixed at one end to said frame, a head adjacent the other end of said mandrel, flame heating means in said head to heat an annular increment of said tube, a plurality of nozzles in said head between said flame heating means and said mandrel to direct coolant against an annular increment of said tube, two longitudinally spaced guides each comprising a plurality of rollers mounted on said frame for rotation in planes of radii extending from the axis of said mandrel, resilient means to urge at least one of said rollers toward said mandrel, means positively to limit the extent of movement of another of said rollers away from said mandrel, each roller of each guide being aligned with a roller of the other guide, said rollers acting each to clamp an elongate member to the exterior of said tube with resilient pressure in position to be bonded thereto while said tube and members and said rollers and mandrel are moved relative to each other to heat to bonding temperature and thereafter cool successive annular increments of said tube.

2. In apparatus for bonding a plurality of elongate members to a tube by heating to fusing temperature and thereafter cooling a bonding metal disposed between adjacent surfaces of the tubes and members, a frame, a hollow mandrel fixed at one end to said frame, a head adjacent the other end of said mandrel, conduits to bring fuel and oxygen to said head from said fixed end, a plurality of nozzles in said head to burn said fuel and direct the flame thereof toward a tube overlying said mandrel, a conduit to bring coolant to said head from said fixed end, a plurality of nozzles disposed between said fuel nozzles and said mandrel in said head to direct coolant against an annular increment of said tube, a plurality of rollers mounted on said frame for rotation in planes of radii extending from the axis of said mandrel, resilient means to urge at least one of said rollers toward said mandrel, adjustable means positively to limit the extent of movement of another of said rollers away from said mandrel, said rollers acting each to clamp an elongate member to the exterior of said tube with resilient pressure in position to be bonded thereto while said tube and members and said rollers and mandrel are moved relative to each other to heat to bonding temperature and thereafter cool successive annular increments of said tube.

3. In an apparatus for bonding an elongate member having an outwardly extending fin portion to the exterior of a tube substantially parallel to the tube axis by fusing a bonding metal on the exterior of the tube, a frame, a mandrel carried by said frame adapted to lie inside of said tube, means carried by said mandrel to heat to a bonding temperature an adjacent annular segment of said tube, means adjacent said heating means and disposed between said heating means and said mandrel to cool an adjacent segment of said tube, and guide means carried by said frame and adapted to engage an elongate member in at least two longitudinally spaced zones to hold said elongate member and said tube fixed with respect to each other in position to be bonded together as the assembly of tube and member is moved with respect to said heating means, said cooling means and said guide means progressively to heat and thereafter to cool successive annular segments of said tube.

4. In apparatus for bonding an elongate member to the exterior of a tube substantially parallel to the tube axis by fusing a bonding metal disposed on the exterior of the tube, a frame, a mandrel secured at one end to said frame, a head carried by the other end of the mandrel and having a portion adapted to fit closely inside of said tube, heating means in said head to heat an annular increment of said tube, cooling means to direct coolant against another annular increment of said tube, said cooling means being disposed between said heating means and said mandrel, means carried by said frame to hold an elongate member against the exterior of said tube substantially parallel to the tube axis, said holding means engaging said elongate member in at least two longitudinally spaced zones and being adapted to hold said elongate member and said tube fixed with respect to each other as the assembly of tube and member are moved with respect to said head first to heat and then cool successive annular increments of said tube to bond said tube and member together.

5. In apparatus for bonding an elongate member to the exterior of a tube substantially parallel to the tube axis by fusing a bonding metal disposed on the exterior of the tube, a frame, a hollow mandrel secured at one end to said frame, a head adjacent the other end of said mandrel and adapted to fit closely inside of the said tube, flame heating means in said head to heat an annular increment of said tube and to direct the hot products of combustion along said tube in a direction away from said mandrel to preheat parts thereof remote from said increment, cooling means positioned in said head between said flame heating means and said mandrel to direct coolant against another annular increment of said tube, conduits in said hollow mandrel leading from said fixed end to said heating means and cooling means respectively, and guide means supported by said frame and adapted to engage an elongate member in longitudinally spaced zones to hold said member against the exterior of said tube parallel to its axis as said tube and head are moved relative to each other to first heat and then cool successive annular increments of said tube to bond said tube and member together.

6. In apparatus for simultaneously bonding a plurality of elongate members having outwardly extending fin portions, to the exterior of a tube by fusing and thereafter cooling a bonding metal disposed between adjacent surfaces of the tube and members, a frame, a hollow mandrel fixed at one end to said frame, a head adjacent the other end of said mandrel, conduits to bring fuel and oxygen to said head from said fixed end, a plurality of fuel-burning nozzles in said head to burn said fuel and direct the flame thereof toward a tube overlying said head, a conduit to bring coolant to said head from said fixed end, a plurality of coolant nozzles disposed in said head between said fuel-burning nozzles and said mandrel to direct coolant against an annular increment of said tube, and two longitudinally spaced sets of aligned rollers adapted to hold a plurality of elongate members against the exterior of a tube in position to be bonded thereto generally parallel to the axis of said tube while said tube and members and said rollers and mandrel are moved relative to each other to heat to bonding temperature and thereafter cool successive annular increments of said tube.

7. In an apparatus for simultaneously bonding a plurality of elongate members having outwardly extending fin portions to the exterior of a tube by heating to bonding temperature and thereafter cooling successive annular increments of the tube having the elongate members positioned therealong and with a bonding metal disposed between adjacent surfaces of the tube and fins, a supporting structure, a mandrel secured at one end to said structure, a head adjacent the other end of said mandrel, conduit means associated with said mandrel to bring fuel to said head, a plurality of fuel burning nozzles in said head to burn said fuel and thereby heat a tube surrounding said head, said head having a portion adapted to fit closely inside of said tube, said portion being disposed between said nozzles and said mandrel whereby products of combustion are directed away from said mandrel, and means mounted on said structure and arranged to engage said elongate members in at least two longitudinally spaced zones to hold said elongate members against the exterior of said tube as said tube and head are moved relative to each other to heat successive annular increments of said tube.

8. In an apparatus for simultaneously bonding a plurality of elongate members having outwardly extending fin portions to the exterior of a tube by heating to bonding temperature and thereafter cooling successive annular increments of the tube having the elongate members positioned therealong and with a bonding metal disposed between adjacent surfaces of the tube and fins, a supporting structure, a mandrel secured at one end to said structure, a head adjacent the other end of said mandrel, conduit means associated with said mandrel to bring fuel to said head, a plurality of fuel burning nozzles in said head to burn said fuel and thereby heat a tube surrounding said head, said head having a portion adapted to fit closely inside of said tube, said portion being disposed between said nozzles and said mandrel whereby products of combustion are directed away from said mandrel, said mandrel having a plurality of cooling nozzles interposed between said fuel-burning nozzles and said mandrel, conduit means associated with said mandrel to conduct coolant to said cooling nozzles, and means mounted on said structure and adapted to hold said elongate members against the exterior of said tube as said tube and head are moved relative to each other to heat successive annular increments of said tube.

JOHN W. BROWN, JR.

REFERENCES CITED

The following references are of record in the file of this patent:

UNITED STATES PATENTS

| Number | Name | Date |
| --- | --- | --- |
| 858,258 | Briscoe | June 25, 1907 |
| 1,445,220 | Lee | Feb. 13, 1923 |
| 1,660,576 | Owston | Feb. 28, 1928 |
| 1,797,795 | Ruhr | Mar. 24, 1931 |
| 1,840,734 | Koehring | Jan. 12, 1932 |
| 2,040,240 | Coberly | May 12, 1936 |
| 2,352,325 | Hughey | June 27, 1944 |
| 2,390,855 | Thompson | Dec. 11, 1945 |